UNITED STATES PATENT OFFICE.

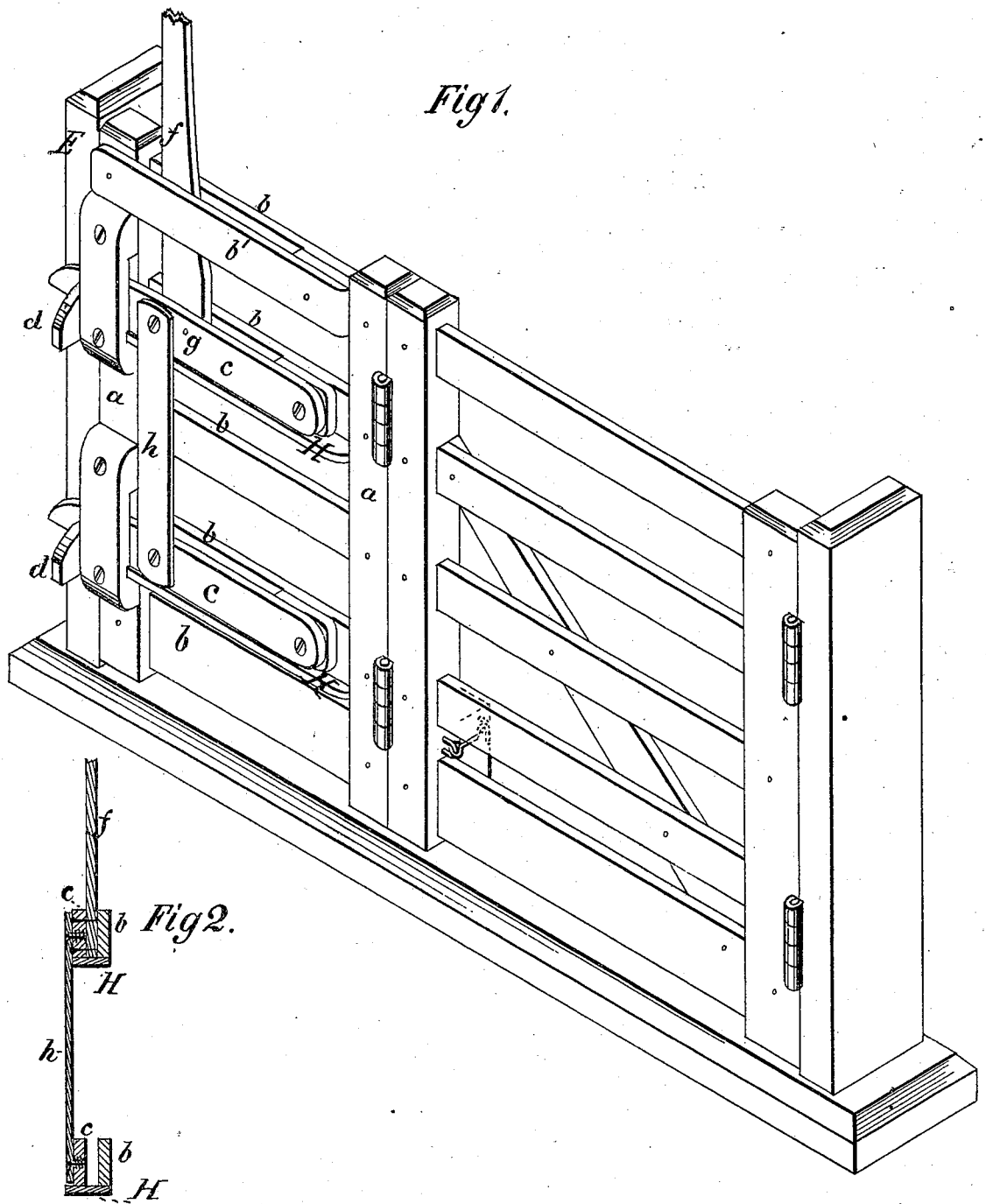

HAROLD S. MOYERS, OF WYTHEVILLE, VIRGINIA, ASSIGNOR TO HIMSELF AND THOMAS L. MOYERS, OF SAME PLACE.

IMPROVEMENT IN FARM-GATES.

Specification forming part of Letters Patent No. 170,489, dated November 30, 1875; application filed September 4, 1875.

*To all whom it may concern:*

Be it known that I, HAROLD S. MOYERS, of Wytheville, Wythe county, and State of Virginia, have invented a new and useful Improvement in Gates, which improvement is fully set forth in the following specification, reference being had to the accompanying drawings, in which—

Figure 1 is a perspective view of a gate with my improvement applied thereto, and Fig. 2 a vertical section thereof on the line $x$ $x$ of Fig. 1.

The object of my improvement is to prevent cattle, swine, and other animals from lifting the ordinary latch employed upon farm and other gates, and so effect an entrance through the gate.

For simplicity of action and cheapness of construction the form or kind of latch shown in the drawings is that commonly used for farm and country purposes; but without my improvement has heretofore required appliances for securing the gate against the entrance of animals, which were annoying to manipulate on opening and closing the gate, and which, if left unadjusted, rendered the gate unprotected against the entrance of said animals.

As shown in the drawings, $a$ denotes the upright bars, and $b$ the horizontal or cross-bars, of the gate, to two of the latter of which I apply the ordinary latch $c$, which engages with the catch $d$ of the gate-post E. Opposite the upper cross-bar $b$ of the gate I apply an auxiliary bar, $b'$, as shown, between which bars a handle, $f$, is made, to articulate (in the act of opening and closing the gate) upon a pin, $g$, which projects through the upper latch $c$, as clearly shown in Fig. 1. The two latches $c$ $c$ (shown in the figure) are connected by a tie-bar, $h$, so that both of them may be lifted simultaneously by the handle $f$. It is evident, however, that but one latch may be used in connection with my improvement, which I will now describe.

H H are guard-pieces secured to the under edge of the cross-bars $b$, to which the latches $c$ $c$ are applied. These guard-pieces extend out flush with the outer faces of the latches $c$; or they may be made to project beyond the outer surface of said latches, so that no hold can be had upon the under edge of the latches, whereby swine or cattle could elevate the latches, and thus open the gate.

It is evident that if an animal should thrust its horn or nose beneath the guards H any upward pressure would act to lift the entire gate, but would not displace the latches; and it is equally apparent that such lifting action could not displace the gate from between its outer posts.

Having thus described my invention, what I claim as new, and desire to secure by Letters Patent, is—

The guard H, in combination with the lifting-latch $c$ of a gate, substantially as and for the purpose described.

HAROLD SOFTLEY MOYERS.

Witnesses:
WILLIAM WEBB,
J. A. RICH.